United States Patent
Prestl

(10) Patent No.: US 6,405,820 B1
(45) Date of Patent: Jun. 18, 2002

(54) DISTANCE-RELATED ELECTRONIC DRIVING SPEED REGULATING SYSTEM

(75) Inventor: Willibald Prestl, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/600,907

(22) PCT Filed: Dec. 9, 1998

(86) PCT No.: PCT/EP98/07986

§ 371 (c)(1),
(2), (4) Date: Jul. 24, 2000

(87) PCT Pub. No.: WO99/37498

PCT Pub. Date: Jul. 29, 1999

(30) Foreign Application Priority Data

Jan. 24, 1998 (DE) .......................................... 198 02 704

(51) Int. Cl.[7] ................................................ B60T 8/00
(52) U.S. Cl. .......................... 180/167; 180/179; 701/96
(58) Field of Search ........................... 318/587; 701/93, 701/96; 180/167, 169, 170, 178, 179

(56) References Cited

U.S. PATENT DOCUMENTS

| 5,014,200 | A | | 5/1991 | Chundrlik et al. | |
|---|---|---|---|---|---|
| 5,400,864 | A | | 3/1995 | Winner et al. | |
| 5,454,442 | A | * | 10/1995 | Labuhn et al. | ............... 180/169 |
| 5,477,457 | A | | 12/1995 | Okada | |
| 5,587,908 | A | | 12/1996 | Kajiwara | |
| 5,670,953 | A | * | 9/1997 | Satoh et al. | ................ 180/169 |
| 5,708,584 | A | * | 1/1998 | Doi et al. | ...................... 701/96 |
| 5,938,714 | A | * | 8/1999 | Satonaka | .................... 180/169 |
| 6,044,321 | A | * | 3/2000 | Nakamura et al. | .......... 180/179 |
| 6,223,117 | B1 | * | 4/2001 | Labuhn et al. | ................ 701/93 |
| 6,292,737 | B1 | * | 9/2001 | Higashimata et al. | ....... 180/169 |

FOREIGN PATENT DOCUMENTS

| DE | 44 17 593 | 11/1994 |
|---|---|---|
| DE | 44 37 678 | 5/1996 |
| DE | 196 46 104 | 4/1998 |
| EP | 0 501 346 A2 | 9/1992 |

* cited by examiner

Primary Examiner—Michael Mar
(74) Attorney, Agent, or Firm—Crowell & Moring LLP

(57) ABSTRACT

The invention relates to a distance-related electronic driving speed regulating system for motor vehicles, wherein a predetermined constant speed is maintained during a first regulating mode until a predetermined minimal distance to a preceding vehicle is reached or surpassed. When the predetermined minimal distance is reached or surpassed during a second regulating mode, the speed is regulated in such a way that the predetermined minimal distance is maintained in the form of a distance-regulated follow-on drive. If the gas pedal is actuated during the first or the second regulating mode to accelerate to an increased actual speed exceeding the momentarily predetermined speed, a new speed is predetermined by actuating a set operating element depending on the increased actual speed.

10 Claims, 1 Drawing Sheet

DISTANCE-RELATED ELECTRONIC DRIVING SPEED REGULATING SYSTEM

BACKGROUND AND SUMMARY OF THE INVENTION

The invention relates to a distance-related electronic driving speed regulating system for motor vehicles.

Driving speed regulating systems of this type are known, for example, from U.S. Pat. No. 5,014,200 or from European Patent Document EP 0 501 346 B1. In the case of such driving speed regulating systems, a predetermined constant speed is always maintained during a first regulating mode until a predetermined minimal distance to a preceding vehicle has been reached or is surpassed. Starting from the reaching or surpassing of this predetermined minimal distance, a regulating of the speed takes place during a second regulating mode such that the predetermined minimal distance is maintained in the form of a distance-regulated follow-on drive.

For the programming-in of the predetermined speed, a process is known, for example, from European Patent Document EP 0 501 346 B1 as well as from VDO-Querschnitt 2, "Tempostat E", VDO—Adolf Schindling AG, Schwalback (DE), May 1979, in which the driver carries out an acceleration to a desired speed value and subsequently actuates a speed set switch in order to store the momentary speed of the vehicle as the predetermined speed. If, during the subsequent regulating mode, the driver desires an acceleration or a deceleration of the vehicle speed, this can only take place in a cumbersome manner by actuating a special speed changing switch during the regulating mode.

In the case of other non-prior art driving speed regulating systems, the preselection of the predetermined speed takes place exclusively by touching incrementing or decrementing buttons or switches, in which case the predetermined speed can be upshifted or reduced in fixed steps. In the case of extensive changes of the predetermined speed desired by the driver, this results in high operating expenditures as a result of multiple touching.

It is an object of the invention to improve a distance-related electronic driving speed regulating system of the above-mentioned type such that a flexible, fast and simple manner changing the predetermined speed is created.

This object is achieved by distance-related electronic driving speed regulating system for motor vehicles, wherein a predetermined constant speed is maintained during a first regulating mode until a predetermined minimal distance to a preceding vehicle is reached or surpassed. When this predetermined minimal distance is reached or surpassed, during a second regulating mode, the speed is regulated such that the predetermined minimal distance is maintained in the form of a distance-regulated follow-on drive. In the event of an acceleration implemented by actuating the gas pedal (acceleration in the regulating mode) in the first or the second regulating mode beyond the momentarily predetermined speed (100 km/h) to an increased actual speed (125 km/h; 105 km/h), a new speed (120 km/h, 130 km/h; 110 km/h) is predetermined by operating a set operating element as a function of the increased actual speed. The invention is characterized in that the setting of the predetermined speed can additionally be carried out by a switching operating element, which is to be operated manually in order to increment the speed in steps. In the event of an actuation of the set operating element after reaching an increased actual speed (125 km/h; 105 km/h) because of the acceleration implemented by the actuation of the gas pedal during the regulating mode, the new predetermined speed is the speed which is closest to the actual speed and which is optionally situated above or below the increased actual speed and can also be reached by the switching operating element (130 km/h or 120 km/h; 110 km/h). Each momentarily predetermined speed can be displayed to the driver by an illuminated display combined with the speed display (digital or analog speedometer). Advantageous further developments of the invention are described herein.

According to the invention, in the event of an acceleration (implemented by actuating the accelerator pedal during regulating mode) beyond the momentarily predetermined speed to an increased actual speed, a new speed is predetermined as a function of the increased actual speed when a set operating element is actuated by the driver. In the following, increased actual speed is always an actual speed which is above the momentarily predetermined speed.

The essence of the invention is the setting of the predetermined speed additionally by switching operating elements (buttons or switches), which are to be actuated manually so as to increment or decrement the speed in steps. If such a switching operating element is present, the new predetermined speed, in the event of an actuation of the set operating element after reaching an increased actual speed because of the acceleration carried out by the actuation of the accelerator pedal during the regulating mode, is the next speed which is situated above or below the increased actual speed and can also be reached by the switching operating element. Accordingly, a rounding-up or off takes place starting from the reached increased actual speed. The reason for the rounding-up or-off is, in particular, that the speeds normally which can be reached in steps can be displayed, but the speed values situated in-between can not. However, the driver should always receive a display of the just predetermined speed. Because the driving speed regulating system is distance-related, no such high demand is made on the precision of the predetermined speed. However, the driver's information is in the foreground of the display.

The set operating element is preferably equal to the switching operating element for incrementing in steps. If, in this case, after reaching an increased actual speed because of the acceleration implemented by the actuation of the accelerator pedal during the regulating mode, the switching operating element is actuated once, it is used as the set operating element. As usual, further actuations of this switching operating element result in further incrementing the speed in steps.

However, preferably overriding all functions, an actuation of the switching operating element for incrementing should, in every case, result in an increase by at least one step.

By means of this invention, a useful combination is created between an incremental setting of the desired speed and a setting oriented according to the actual speed, for a driving speed regulating system by which the operating expenditures are reduced and the capability of reacting is increased.

An embodiment of the invention is illustrated in the drawings.

DETAILED DESCRIPTION OF THE DRAWINGS

Figure 1:
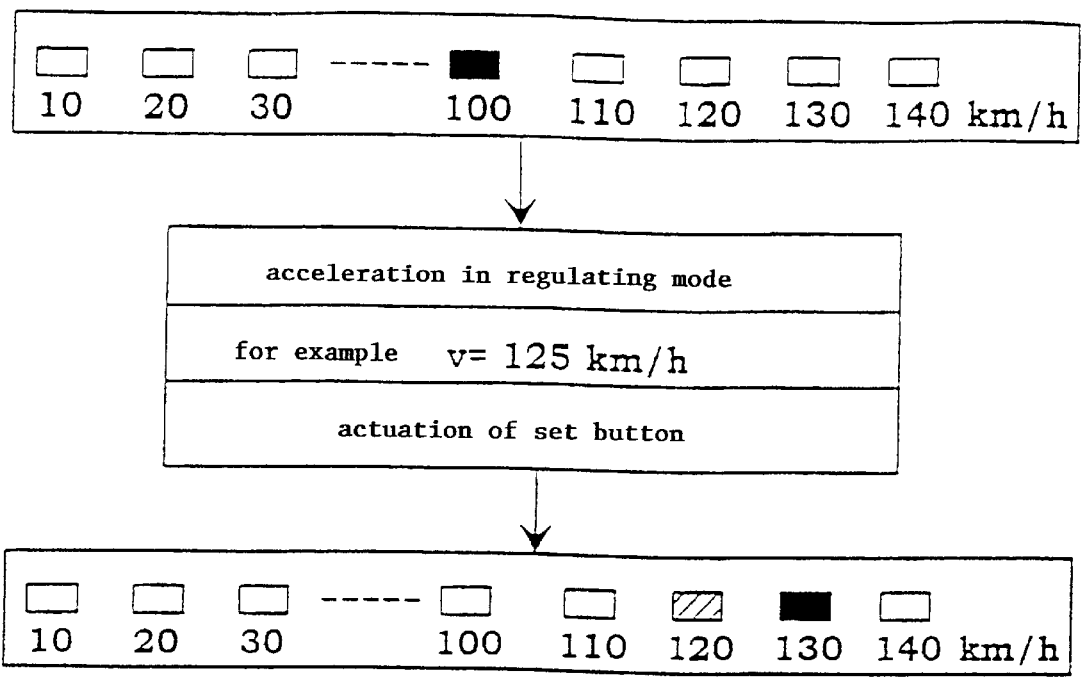
FIG. 1 is a view of an embodiment of the invention in which the increased actual speed is higher than the momentarily predetermined speed by more than one step.

FIG. 1, top, is a display showing a momentary predetermined speed of 100 km/h as a starting condition during a regulating mode. This momentarily predetermined speed may have been incremented previously, in steps, for example, 10 km/h, by a switching operating element in the form of a set button that is to be actuated by the driver manually. Preferably, the speed display (digital or analog speedometer) in the motor vehicle is combined with a luminous display so that each momentarily predetermined speed can be visually displayed to the driver in 10 km/h steps.

When, corresponding to the example according to FIG. 1, starting from the momentarily predetermined speed of 100 km/h, an acceleration takes place in the regulating mode and the vehicle is therefore accelerated to an increased actual speed of v=125 km/h, and subsequently the set button is depressed for incrementing as the set operating element, the display according to FIG. 1, bottom, jumps to a new predetermined speed of 120 km/h when there is a rounding-off (hatched), or 130 km/h when there is a rounding-up (filled in in black). According to the invention, these newly predetermined speeds are the next speeds which are below (120 km/h when rounding-off) or above (130 km/h when rounding up) the increased actual speed of 125 km/h and can also be reached in steps of 10 km/h by means of the set button used as the switching operating element.

In this case, the set button is simultaneously the switching operating element as well as the set operating element.

Figure 2:
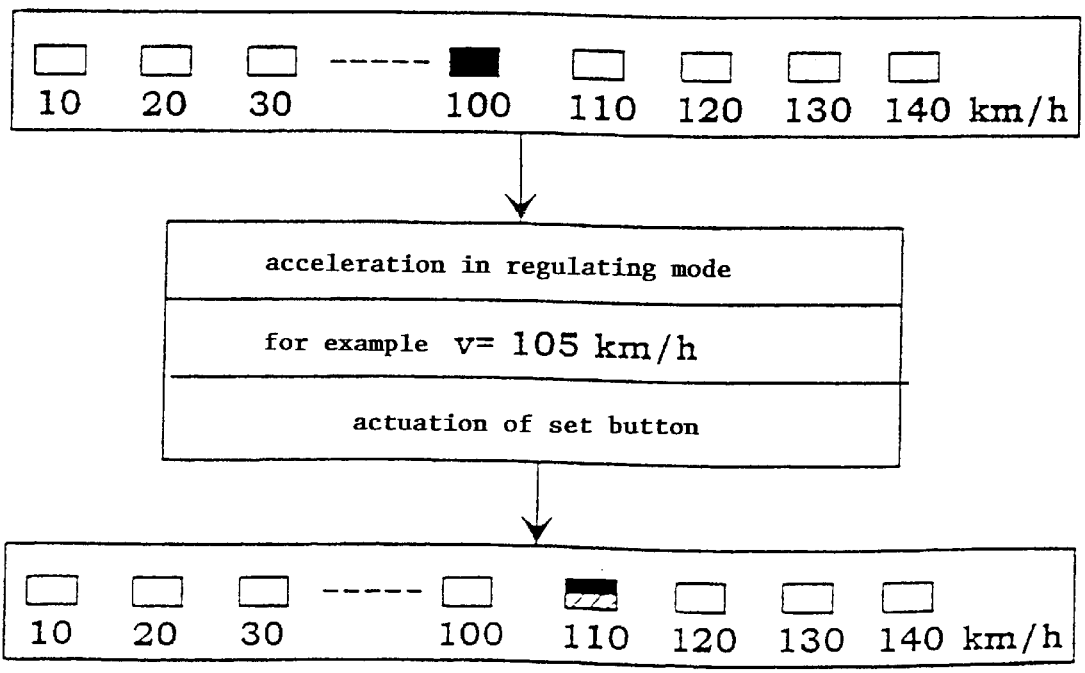
FIG. 2 is a view of an embodiment of the invention in which the increased actual speed is higher than the momentarily predetermined speed by less than one step.

In contrast to the embodiment according to FIG. 1, in the embodiment according to FIG. 2, the increased actual speed v=105 km/h. According to the invention, overriding all functions, an actuation of the switching operating element for incrementing should also in its function as a set operating element in every case result in an increase by at least one step; here, therefore 10 km/h. Since, starting from the momentarily predetermined speed of 100 km/h, the next higher speed which can be reached by upshifting in steps is the speed of 110 km/h, this speed of 110 km/h is predetermined as the new speed, independently of whether there is rounding-up or-off.

The embodiment according to the invention demonstrates that not only are the operating expenditures for a driving speed regulating system in motor vehicles reduced, but also the number of required visual checks which divert the attention from the traffic situation are reduced. Thus, as a result of the driving speed regulating system according to the invention, comfort as well as safety are gained.

What is claimed is:

1. A distance-related electronic driving speed regulation system for a motor vehicle, in which a predetermined constant speed is maintained during a first regulating mode until a predetermined minimal distance to a preceding vehicle is reached or surpassed, when said predetermined minimal distance is reached or surpassed, during a second regulating mode the speed is regulated such that the predetermined minimal distance is maintained as a distance-regulated follow-on drive, the system comprising:

means for predetermining a new speed by operating a set operating element as a function of an increased actual speed in the event of an acceleration implemented via actuation of a gas pedal in either the first or second regulating modes beyond a momentarily predetermined speed to the increased actual speed;

wherein a setting of the predetermined speed is additionally carried out via a switching operating element, which is operated manually in order to increment the speed in predetermined speed steps;

in the event of an actuation of the set operating element after reaching the increased actual speed via an acceleration implemented by the gas pedal during the regulating mode, a new predetermined speed is set at the closest predetermined incremental speed steps, which may be above or below the increased actual speed, so long as it can be reached by the switching operating element; and wherein each momentarily predetermined speed is displayed to the driver via an illuminated display combined with a speed display.

2. A distance-related electronic driving speed regulation system for a motor vehicle, in which a predetermined constant speed is maintained during a first regulating mode until a predetermined minimal distance to a preceding vehicle is reached or surpassed, when said predetermined minimal distance is reached or surpassed, during a second regulating mode the speed is regulated such that the predetermined minimal distance is maintained as a distance-regulated follow-on drive, the system comprising:

means for predetermining a new speed by operating a set operating element as a function of an increased actual speed in the event of an acceleration implemented via actuation of a gas pedal in either the first or second regulating modes beyond a momentarily predetermined speed to the increased actual speed;

wherein a setting of the predetermined speed is additionally carried out via a switching operating element, which is operated manually in order to increment the speed in steps of 10 km/h; and in the event of an actuation of the set operating element after reaching the increased actual speed via an acceleration implemented by the gas pedal during the regulating mode, a new predetermined speed is set at the closest predetermined incremental speed steps, which may be above or below the increased actual speed, so long as it can be reached by the switching operating element.

3. The distance-related electronic driving speed regulating system according to claim 1, wherein the set operating element is equal to the switching operating element.

4. The distance-related electronic driving speed regulating system according to claim 2, wherein the set operating element is equal to the switching operating element.

5. The distance-related electronic driving speed regulating system according to claim 1, wherein actuation of the set operating element or the switching operating element results, in every case, in an increase of the predetermined speed by at least one step.

6. The distance-related electronic driving speed regulating system according to claim 2, wherein actuation of the set operating element or the switching operating element results, in every case, in an increase of the predetermined speed by at least one step.

7. The distance-related electronic driving speed regulating system according to claim 3, wherein actuation of the set operating element or the switching operating element results, in every case, in an increase of the predetermined speed by at least one step.

8. The distance-related electronic driving speed regulating system according to claim 4, wherein actuation of the set operating element or the switching operating element results, in every case, in an increase of the predetermined speed by at least one step.

9. A method of operating a distance-related electronic driving speed regulation system for a motor vehicle, the method comprising the acts of:

when in a driving speed regulating mode, in an event of a vehicle acceleration by operation of a vehicle gas pedal beyond a momentarily predetermined speed to an increased actual speed, operating a set operating element to predetermine a new speed as a function of the increased actual speed;

wherein a setting of the predetermined new speed is additionally performable by a switching operating element operated manually in order to increment the vehicle speed in predetermined speed steps;

wherein in an event of an actuation of the set operating element after reaching the increased actual speed because of the acceleration implemented via the gas pedal, the predetermined new speed is selected to be the closest predetermined incremental speed steps, which may be above or below the increased actual speed if necessary, so long as the selected speed is reachable by the manual operation of the switching operating element; and displaying each momentarily predetermined new speed to a vehicle driver via an illuminated display combined with a speed display.

10. A method of operating a distance-related electronic driving speed regulation system for a motor vehicle, the method comprising the acts of:

when in a driving speed regulating mode, in an event of a vehicle acceleration by operation of a vehicle gas pedal beyond a momentarily predetermined speed to an increased actual speed, operating a set operating element to predetermine a new speed as a function of the increased actual speed;

wherein a setting of the predetermined new speed is additionally performable by a switching operating element operated manually in order to increment the vehicle speed in steps of 10 km/h;

wherein in an event of an actuation of the set operating element after reaching the increased actual speed because of the acceleration implemented via the gas pedal, the predetermined new speed is selected to be the closest predetermined incremental speed steps, which may be above or below the increased actual speed if necessary, so long as the selected speed is reachable by the manual operation of the switching operating element.

* * * * *